(12) United States Patent
Hahn

(10) Patent No.: US 7,390,062 B2
(45) Date of Patent: Jun. 24, 2008

(54) SEAT HAVING CUSHION HEIGHT AND RECLINE ADJUSTMENT MECHANISMS

(75) Inventor: Douglas C. Hahn, La Valle, WI (US)

(73) Assignee: Seats Incorporated, Reedsburg, WI (US)

( * ) Notice: Subject to any disclaimer, the term of this patent is extended or adjusted under 35 U.S.C. 154(b) by 122 days.

(21) Appl. No.: 11/175,659

(22) Filed: Jul. 6, 2005

(65) Prior Publication Data

US 2007/0007807 A1 Jan. 11, 2007

(51) Int. Cl.
*B60N 2/02* (2006.01)
*A47C 1/00* (2006.01)
*A47C 1/024* (2006.01)

(52) U.S. Cl. .............................. 297/362.13; 297/301.2; 297/344.16; 297/344.13

(58) Field of Classification Search ............ 297/362.13, 297/366, 344.13, 344.14, 344.16, 301.2
See application file for complete search history.

(56) References Cited

U.S. PATENT DOCUMENTS

| | | | | |
|---|---|---|---|---|
| 3,338,632 A * | 8/1967 | Kleinsorge | ................. | 297/330 |
| 3,655,968 A * | 4/1972 | Moore et al. | ................ | 378/178 |
| 3,788,697 A * | 1/1974 | Barton et al. | ............... | 297/307 |
| 3,913,975 A * | 10/1975 | Carter | ......................... | 297/307 |
| 4,408,800 A * | 10/1983 | Knapp | ..................... | 297/301.2 |
| 4,455,046 A * | 6/1984 | Linderoth | .................. | 296/68.1 |
| 5,651,585 A * | 7/1997 | Van Duser | ............. | 297/344.16 |
| 5,689,995 A | 11/1997 | Heckel, Jr. | | |
| 5,743,591 A * | 4/1998 | Tame | ...................... | 297/216.1 |
| 5,778,733 A | 7/1998 | Stringer | | |
| 6,116,103 A | 9/2000 | Heckel, Jr. | | |
| 6,347,778 B1 * | 2/2002 | Koga et al. | .................. | 248/421 |
| 7,134,713 B1 * | 11/2006 | Tseng | ......................... | 297/68 |
| 7,134,721 B2 * | 11/2006 | Robinson | ................. | 297/284.3 |
| 7,147,287 B2 * | 12/2006 | Kuivala | ................. | 297/344.14 |

OTHER PUBLICATIONS

Porter Group, LLC, Spinlok®, http://www.portergroupllc.com/solutions/spinlok.asp, published prior to Jul. 6, 2004.
New! Drivers Safety Seat, The C.E. White Co., published prior to Jul. 6, 2004, New Washington, OH.

* cited by examiner

*Primary Examiner*—Sarah B McPartlin
(74) *Attorney, Agent, or Firm*—Michael Best & Friedrich LLP

(57) ABSTRACT

A seat includes a base portion and an upright portion pivotable with respect to the base portion. The seat includes a reclining mechanism that includes first and second toothed members that are selectively engaged and disengaged to resist and permit, respectively, the angle of the upright portion with respect to the base portion. The first and second toothed members are engaged and disengaged through rotation of a cam mechanism. The seat also includes a bottom seat cushion height adjustment mechanism that permits raising and lowering of the bottom seat cushion with respect to a base portion of the frame. The bottom seat cushion height adjustment mechanism includes a slidable member that is slidable with respect to the base frame, and a plurality of cams that convert linear motion of the slidable member into vertical movement of the bottom seat cushion. A single biasing member biases the upright portion and bottom seat cushion toward their respective default positions in the absence of an overwhelming opposing force from an operator seated in the seat. The seat includes a seat belt assembly having all points mounted to the frame of the seat frame, and not to the vehicle in which the seat is installed. The biasing member is not a structural element of the seat, and all stress transferred to the seat through the seat belt assembly is borne by the seat frame and the first and second toothed members of the reclining mechanism.

2 Claims, 12 Drawing Sheets

SEAT HAVING CUSHION HEIGHT AND RECLINE ADJUSTMENT MECHANISMS

BACKGROUND

The present invention relates to a seat having cushion and recline adjustment mechanisms.

SUMMARY

In one embodiment, the invention provides a seat comprising a base portion including a rigid base frame and a seat bottom cushion supported by the base frame and a generally upright portion extending up from and being pivotable with respect to the base portion and including a rigid back frame and a seat back cushion mounted to the back frame. The seat further comprises means for adjusting the height of the bottom cushion through a range of motion with respect to the base frame, and means for adjusting the angle of the upright portion of the seat through a range of motion with respect to the base portion of the seat. The seat also includes a biasing member interconnected between the base portion and upright portion of the seat and actuable in one direction to bias the bottom cushion toward its default height and in a second direction to bias the upright portion of the seat toward its default angle.

In another embodiment, the invention provides a seat comprising a base portion including a rigid base frame and a seat bottom cushion supported by the base frame; a generally upright portion extending up from and pivotable with respect to the base portion and including a rigid back frame, and a seat back cushion mounted to the back frame; an actuable toothed member mounted on a first side of the seat to one of the base frame and back frame for movement with respect to the associated frame; a second toothed member mounted on the first side of the seat to the other of the base frame and back frame; and a biasing member biasing the actuable toothed member into engagement with the second toothed member to resist pivotal movement of the upright portion of the seat with respect to the base portion of the seat. The seat further comprises a lever pivotably mounted to a second side of the seat opposite the first side; and a linkage transferring pivotal movement of the lever into movement of the actuable toothed member.

In another embodiment, the invention provides a seat comprising a base portion including a rigid base frame, a seat bottom cushion supported by the base frame, and a first toothed member mounted to the base frame on a first side of the seat; and a generally upright portion extending up from and pivotable with respect to the base portion and including a rigid back frame, a seat back cushion mounted to the back frame, and a second toothed member mounted to the back frame on the first side of the seat. The seat further includes a belt having opposite ends each interconnected to one of the upright and base portions of the seat; a first buckle member interconnected with the belt; and a second buckle member affixed to one of the upright and base portions of the seat. Interconnecting the first and second buckle members causes portions of the belt to extend across the lap and chest of a person sitting in the seat. The first and second toothed members are selectively engageable and disengagable to resist and permit, respectively, pivotal movement of the upright portion of the seat with respect to the base portion of the seat.

In another embodiment, the invention provides a seat comprising a base portion including a rigid base frame and a cushion supported by the base frame; a generally upright portion extending up from the base portion and including a rigid back frame and a cushion mounted to the back frame, the seat defining an included angle between the top of the base portion cushion and front of the upright portion cushion, the upright portion of the seat being pivotable with respect to the base portion; a mechanism for selectively locking and unlocking the upright portion of the seat to resist and permit, respectively, pivotal movement of the upright portion of the seat with respect to the base portion of the seat; and means for biasing the upright portion of the seat toward the minimum included angle. The load path for resisting forward movement of the upright portion of the seat includes the locking mechanism and does not include the biasing member.

In another embodiment, the invention provides a seat comprising a frame; a bottom cushion; a slidable member slidable with respect to the frame; and at least one cam pivotably mounted to the frame and pivotably interconnected with both the slidable member and the bottom cushion to transfer linear sliding movement of the slidable member into vertical movement of the bottom cushion with respect to the frame.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
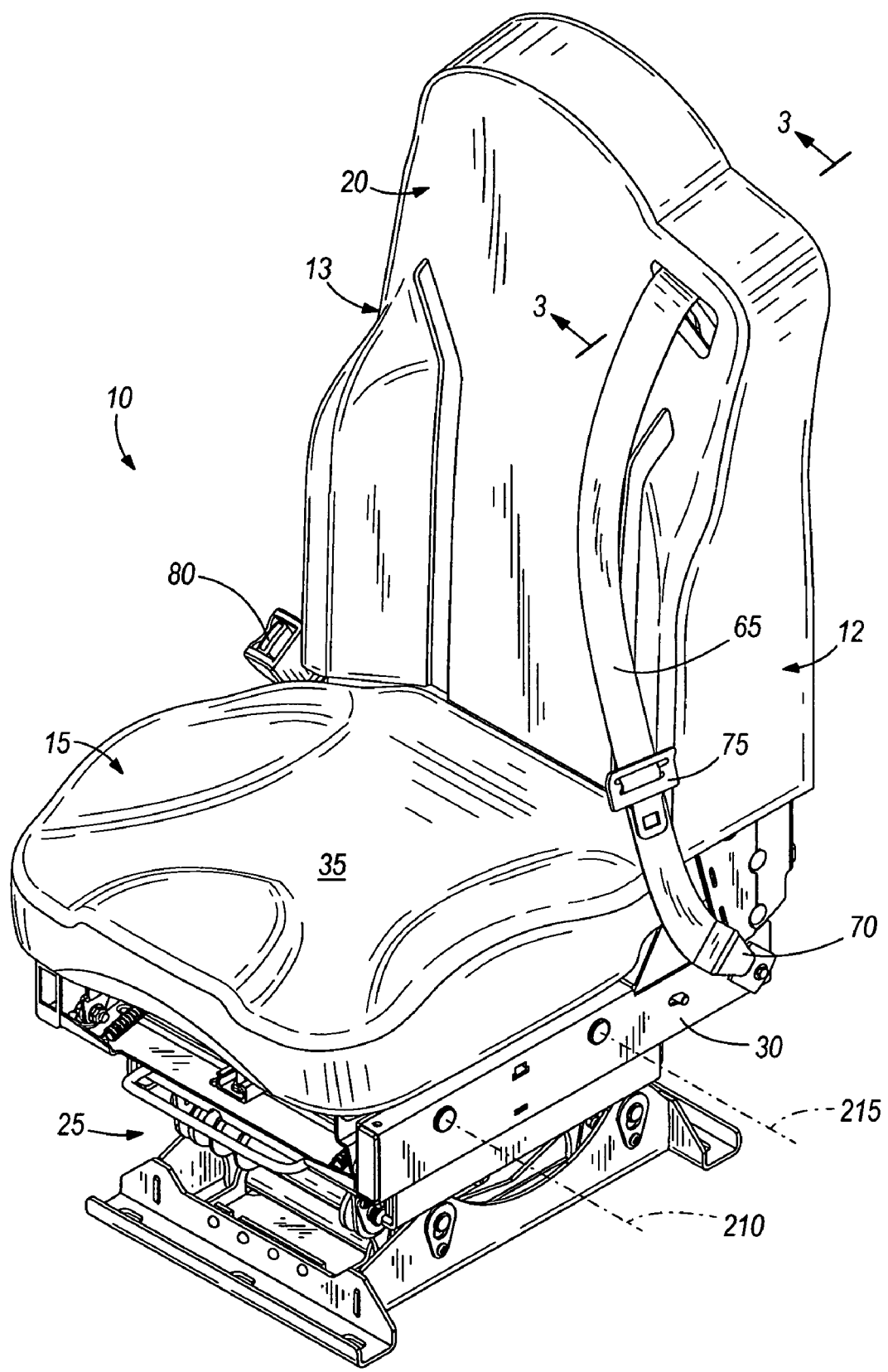
FIG. 1 is a front perspective view of a seat embodying the invention.

FIG. 1 illustrates a seat 10 having first and second sides 12, 13 (also referred to as left and right sides, respectively). The seat 10 includes a base portion 15 and an upright portion 20 that extends up from and is pivotable with respect to the base portion 15. The base and upright portions 15, 20 (together referred to herein as the "operator-occupied" portion of the seat) are supported by a suspension and shock absorbing apparatus 25 that provides a smooth ride for an operator seated in the seat 10.

The suspension and shock absorbing apparatus 25 is described and illustrated in more detail in co-pending and commonly-assigned U.S. patent application Ser. No. 11/175, 660, titled "Seat Having Suspension System" and filed on Jul. 6, 2005, the entire contents of which are incorporated herein by reference.

Figure 2:
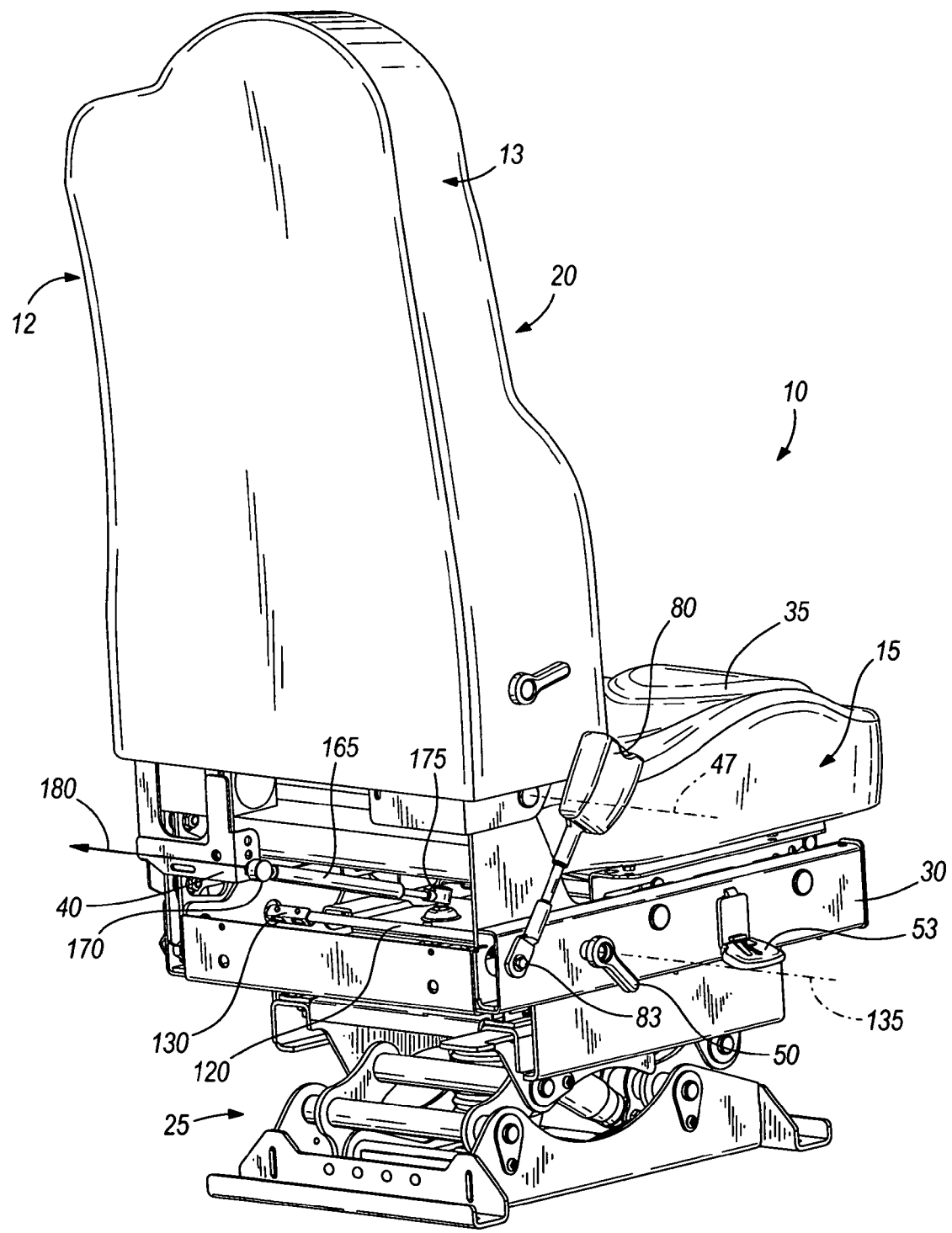
FIG. 2 is a rear perspective view of the seat.
Figure 3:
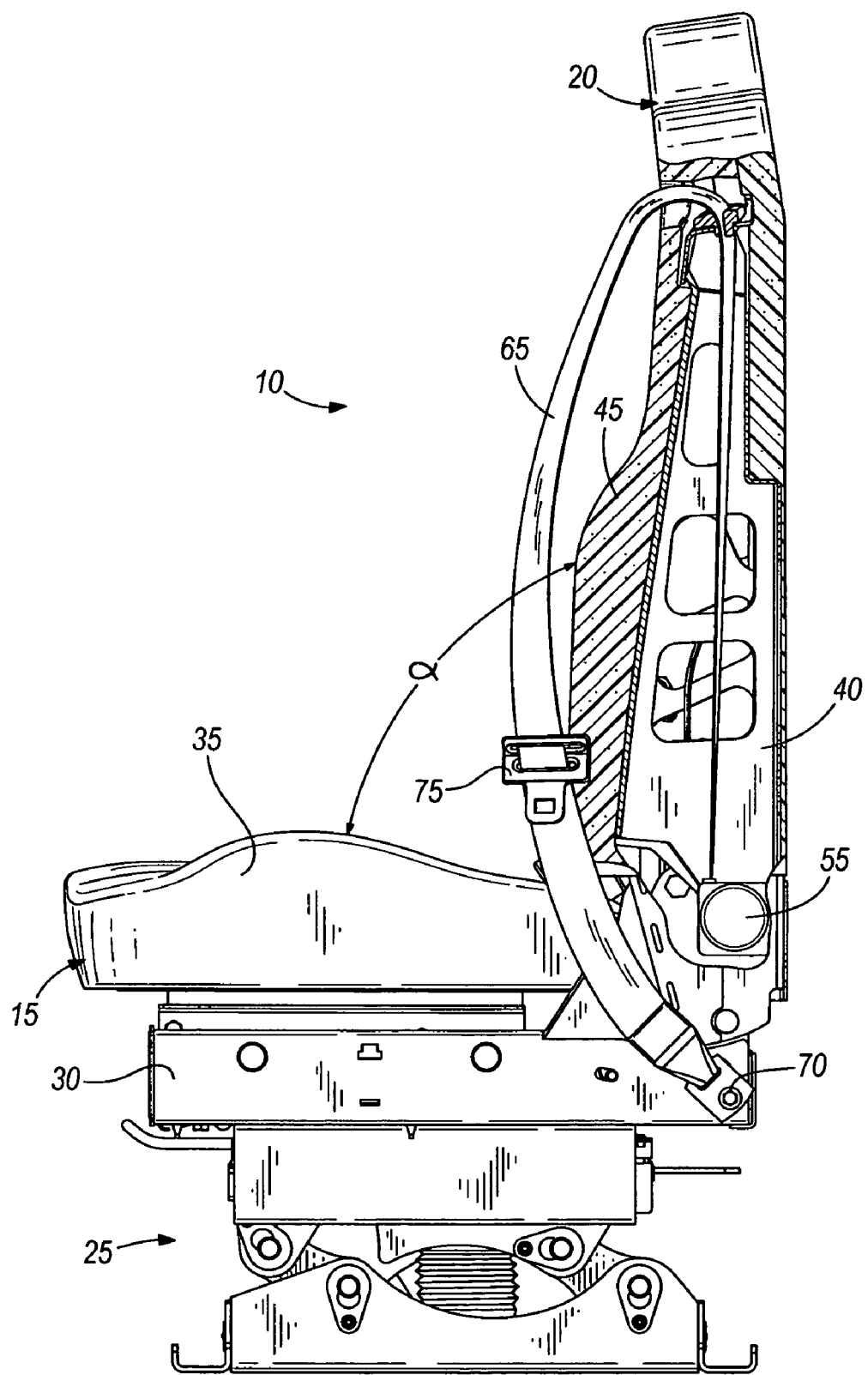
FIG. 3 is a cross-sectional view taken along line 3-3 in FIG. 1.
Figure 4:
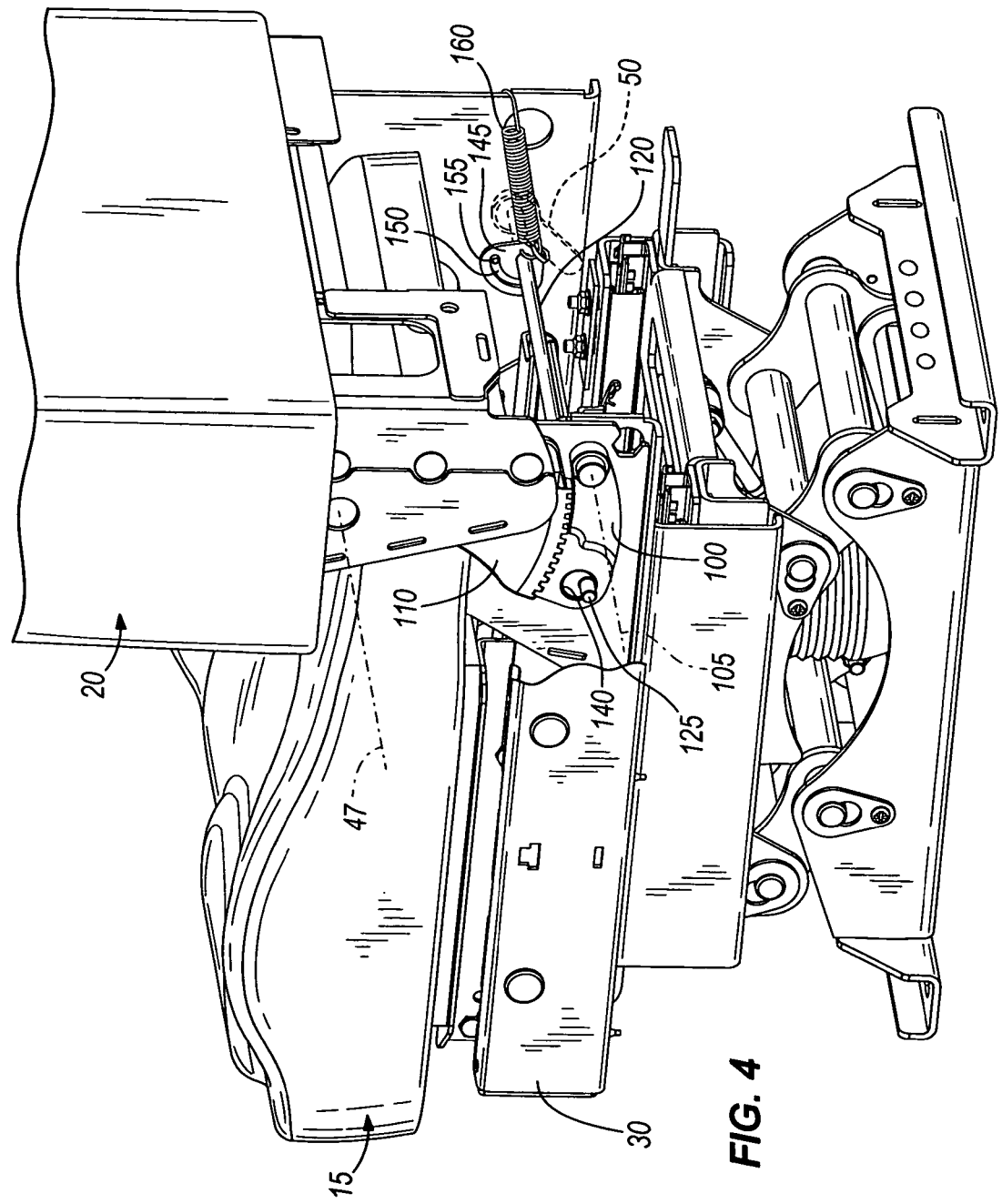
FIG. 4 is a rear perspective view of a seat reclining mechanism of the seat in a first operating position.

With reference to FIGS. 1-3, the base portion 15 of the seat 10 includes a rigid base frame 30 and a bottom cushion 35 for supporting an operator seated in the seat 10. With reference particularly to FIG. 3, the upright portion 20 includes a rigid back frame 40 and a seat back cushion 45 mounted to the back frame 40. The upright portion 20 of the seat 10 is pivotably mounted to the base portion 15 about a pivot axis 47 (FIGS. 2 and 4). The orientation of the upright portion 20 of the seat 10 with respect to the base portion 15 is characterized by the included angle a (FIG. 3) between the top of the bottom cushion 35 and the front of the seat back cushion 45. The upright portion 20 is pivoted "forward" when the included angle a is decreased, and pivoted "backward" when the included angle a is increased. The upright portion 20 is therefore in its "fully forward" position when at the end of its range of motion in which the included angle a is minimized, and in its "fully backward" or "fully reclined" position when at the end of its range of motion in which the included angle a is maximized.

The recline and bottom cushion height adjustment mechanisms are actuated through respective recline and cushion levers 50, 53 (FIG. 2) on the right side 13 of the seat. The illustrated seat 10 is useful, for example, as the driver's seat in a bus or delivery vehicle having no door on the driver's side. In such vehicles, the driver's seat is often positioned very close to a wall on the left side 12, and there is little clearance for the operator's hand to reach between the wall and seat on the left side 12. Positioning the recline actuation lever 50 and the cushion actuation lever 53 on the right side 13 affords easier access by the operator than if they were on the left side 12. The illustrated seat 10 can be used in other applications, however, whether or not there is a driver's side door.

The illustrated seat 10 is of the type commonly referred to in the art as an "All Belts To Seat" or "ABTS" seat. ABTS seats include seat belt arrangements with all anchor points on the seat frame itself, rather than on any structural portion of the vehicle in which the seat is mounted. ABTS seats are therefore modular in the sense that they can be installed in a vehicle without separate installation considerations for the seat belt. In the United States, Federal Standards FMVSS 207 & 210 dictate the forward force that a seat must withstand through its seat belt (referred to in the art as the "pull test"). To pass the pull test, most ABTS seats require a tether interconnecting the seat and the vehicle in addition to the seat's standard floor mounting.

The illustrated seat 10 includes a seat belt arrangement comprising a belt reel 55 (FIG. 3) mounted to the back frame 40 on the first side 12 of the seat 10, a belt 65 having one end interconnected with the belt reel 55 to facilitate winding the belt 65 onto the belt reel 55 and an opposite end affixed to the base frame 30 at a first anchor point 70 on the first side 12 of the seat, a first buckle member 75 interconnected with the belt 65, and a second buckle member 80 (FIG. 2) affixed to the base frame 30 at a second anchor point 83 on the second side 13 of the seat 10. In this regard, both of the opposite ends of the belt 65 are mounted to the seat frame 30, 40 and not to the vehicle in which the seat 10 is installed. The belt 65 extends up from the belt reel 55 along the back frame 40 to a height even with or slightly above the shoulder height of an operator seated in the seat 10. The belt 65 then extends down to the first anchor point 70. Interconnecting the first and second buckle members 75, 80 causes portions of the belt 65 to extend across the lap and chest of the operator sitting in the seat 10. The first buckle member 75 slides along the belt 65 to accommodate the size of the operator.

Figure 5:
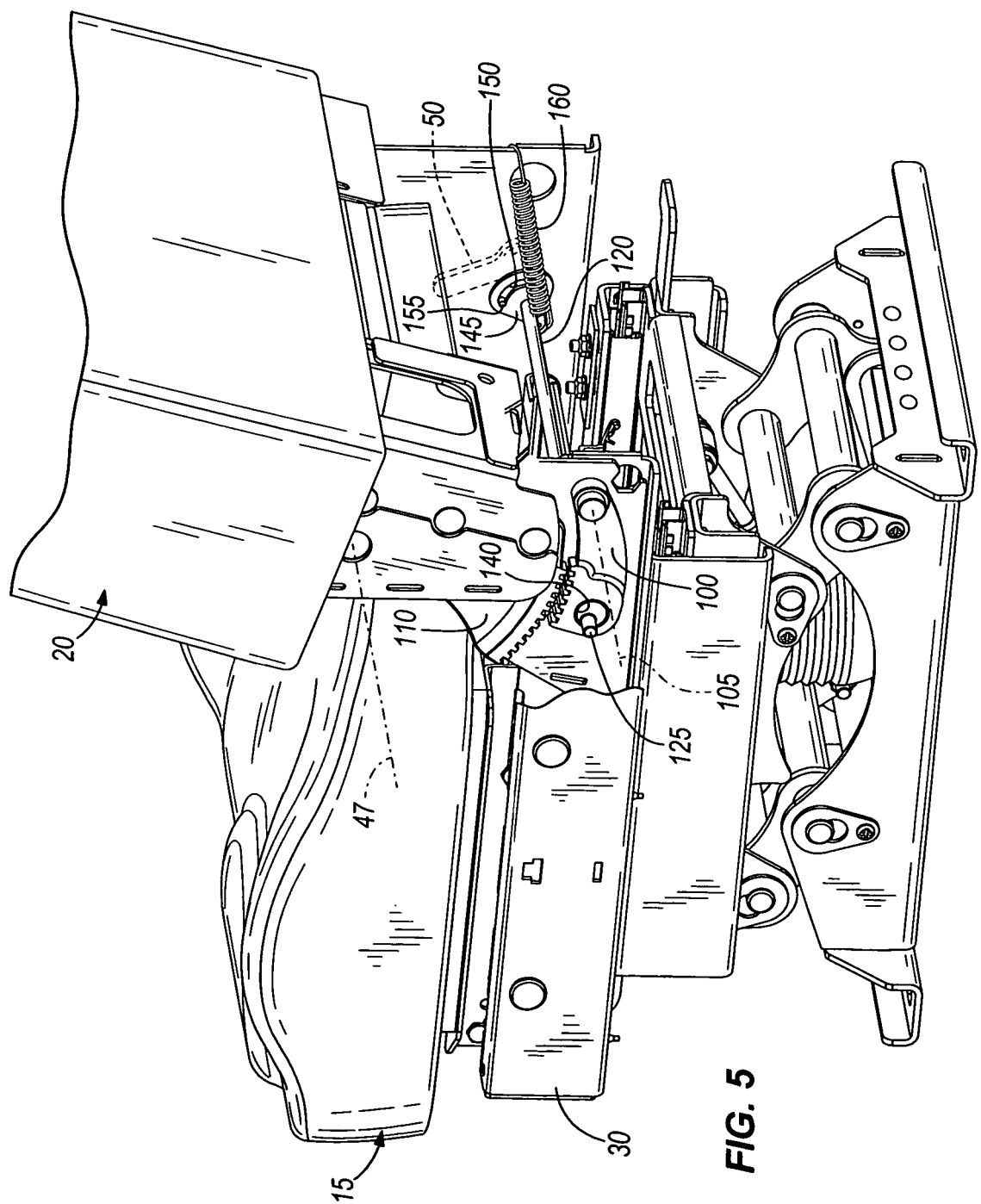
FIG. 5 is a rear perspective view of the reclining mechanism in a second operating position.
Figure 6:
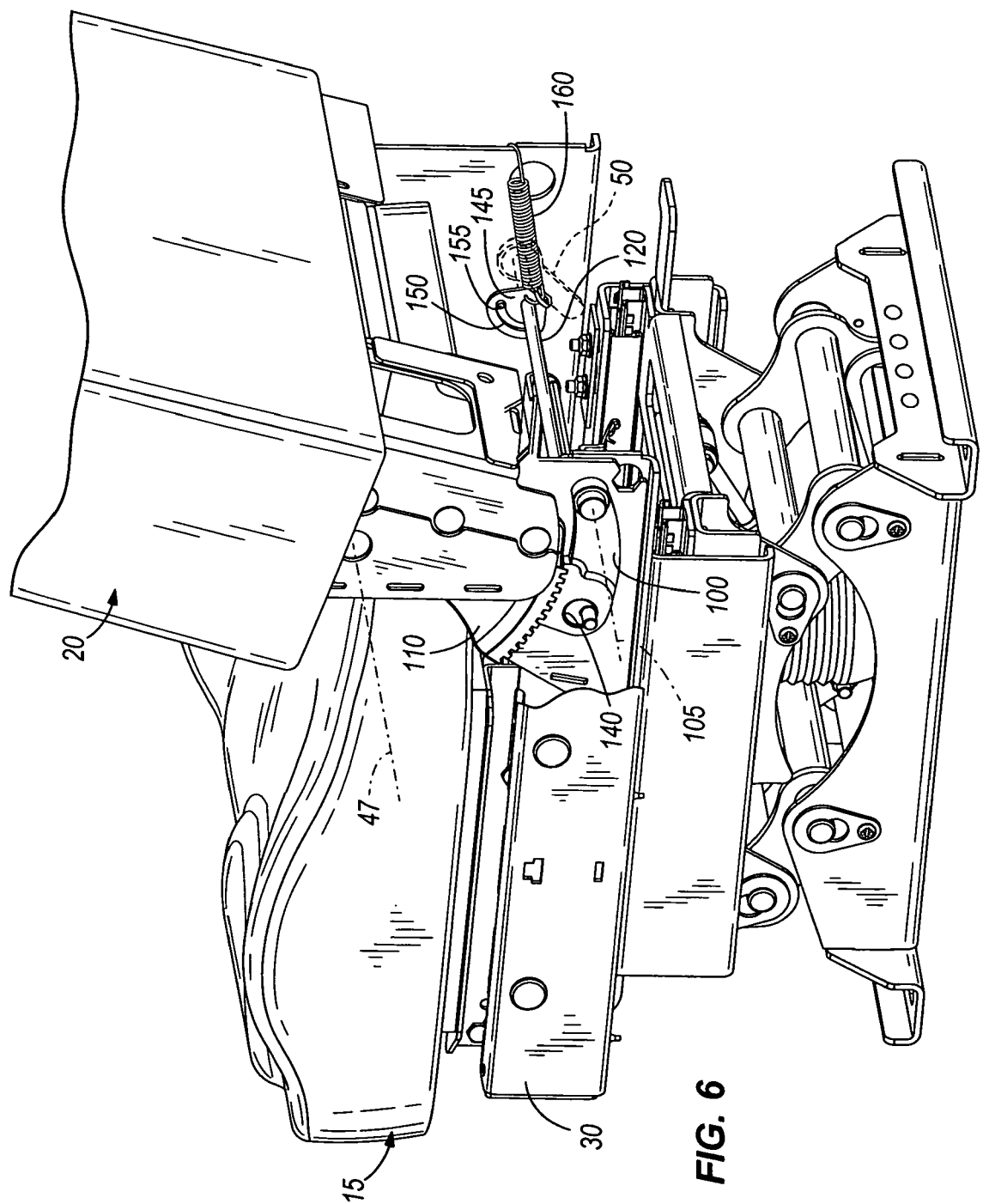
FIG. 6 is a rear perspective view of the reclining mechanism in a third operating position.

FIGS. 4-6 illustrate a reclining feature of the seat 10. The reclining feature includes a first toothed member 100 mounted to the base frame 30 at a pivot point for pivotable movement about a pivot axis 105. The reclining feature also includes a second toothed member 110 mounted to the back frame 40 and fixed against movement with respect to the back frame 40. When the first toothed member 100 engages the second toothed member 110 (as in FIGS. 4 and 6), the toothed members 100, 110 resist pivotal movement of the upright portion 20 of the seat with respect to the base portion 15. When the first toothed member 100 is disengaged from (i.e., pivoted out of engagement with) the second toothed member 110 (as in FIG. 5), the upright portion 20 of the seat is permitted to pivot with respect to the base portion 15.

The reclining feature also includes a recline actuator mechanism for selectively engaging and disengaging the first and second toothed members 100, 110 to resist and permit, respectively, pivotal movement of the upright portion 20 of the seat with respect to the base portion 15 of the seat. With reference to FIG. 2, the recline actuator mechanism includes the recline lever 50, a recline rod 120, a recline cam 125, and a coupling member 130. The recline lever 50 is mounted to the second side 13 of the base frame 30 for pivotable movement, and the recline rod 120 is rigidly coupled to the recline lever 50 such that the recline rod 120 rotates about its longitudinal axis 135 in response to pivoting of the recline lever 50. The coupling member 130 couples the recline rod 120 and recline cam 125 for rotation together under the influence of operator actuation of the recline lever 50.

The illustrated recline cam 125 includes an eccentric pin offset with respect to the recline rod longitudinal axis 135. The first toothed member 100 includes a circular hole 140 through which the eccentric pin extends. The center of the circular hole 140 is offset with respect to the recline rod longitudinal axis 135. When the first toothed member 100 is engaged with the second toothed member 110, the eccentric pin is at or near the bottom of the circular hole 140, in contact with the edge of the hole 140. When the recline lever 50 is actuated up (i.e., pivoted in a clockwise direction as viewed in FIGS. 4-6) from the at-rest position illustrated in FIGS. 4 and 6 to the position illustrated in FIG. 5, the pin describes an arc due to being offset with respect to the recline rod longitudinal axis 135. The arc described by the eccentric pin extends beyond the edge of the circular hole 140 when the first toothed member 100 is engaged with the second toothed member 110. As it moves through its arcuate path, the eccentric pin engages the edge of the circular hole 140 and forces the first toothed member 100 to pivot out of engagement with (i.e., disengage) the second toothed member 110. The operator may then lean back in the seat 10 to cause the upright portion 20 of the seat 10 to pivot backward.

The illustrated recline cam 125 rotates about an axis of rotation (i.e., the longitudinal axis 135 of the recline rod 120) that is non-collinear with the pivot axis 105 of the first toothed member 100. In alternative embodiments, the longitudinal axis 135 of the pivot rod 120 may be collinear with the pivot axis 105 of the first toothed member 100 to effect direct pivoting of the first toothed member 100.

The reclining feature also includes mechanisms for limiting the range of motion of the recline lever 50 and for biasing the first toothed member 100 into engagement with the second toothed member 110. A range-of-motion limiter 145 is rigidly affixed to the recline rod 120 for pivotal movement with the rod 120 about the rod's longitudinal axis 135 in response to actuation of the recline lever 50. The range-of-motion limiter 145 includes an arcuate slot 150 with a radius of curvature centered on the longitudinal axis 135 of the recline rod 120. A limit pin 155 is rigidly affixed to the base frame 30 and received within the arcuate slot 150, and the range of motion of the recline lever 50 is thereby limited by the pin 155 encountering the ends of the arcuate slot 150. In other embodiments, the pin-and-slot arrangement can be reversed, with the pin being carried by the range-of-motion limiter 145 and the arcuate slot being provided in the base frame 30. Alternatively, a pair of pins may be provided on the lever side of the base frame within the path of the recline lever 50 to obstruct pivotal movement of the lever past desired extremes.

The biasing mechanism for the recline feature includes a tension spring 160 having one end affixed to the base frame 30 and the other end affixed to the range-of-motion limiter 145 at a point offset from the longitudinal axis 135 of the recline rod 120. The length and spring constant or stiffness of the tension spring 160 is chosen to apply a moment force to the range-of-motion limiter 145 through the entire range of motion of the recline lever 50, and to bias the range-of-motion limiter 145 to the at-rest position illustrated in FIGS. 4 and 6, in which the first toothed member 100 engages the second toothed member 110. In other embodiments, the tension spring 160 can be replaced with a torsion spring or other type of biasing member, provided such alternative biasing member urges the first toothed member 100 into engagement with the second toothed member 110 and is not so stiff as to make actuation of the recline lever 50 burdensome on the operator in the seat 10. In alternative embodiments, the biasing mechanism may include a biasing member acting directly on the first toothed member 100 in combination with or in place of the illustrated spring. Also, in alternative embodiments, the second toothed member 110 may be actuable and the first toothed member 100 may be either fixed or actuable.

FIG. 2 illustrates a mechanism for biasing the upright portion 20 toward its default position. In the illustrated embodiment, the default position for the upright portion 20 is its fully-forward position, which is illustrated in FIGS. 1-3. The illustrated fully-forward position defines an included angle α of approximately 90°, but alternative embodiments may provide fully-forward positions in which the included angle α is more or less than 90°.

The illustrated mechanism for biasing the upright portion 20 includes a gas spring 165 having a first end 170 pivotably coupled to the back frame 40 at a point offset from the pivot axis 47 of the upright portion 20 and a second, opposite end 175 interconnected to the base frame with a ball-and-socket connection through certain elements of the bottom cushion height adjustment mechanism (as will be described in more detail below). The gas spring 165 is preloaded to increase the distance between its ends 170, 175. When the first toothed member 100 is disengaged from the second toothed member 110, the first end 170 of the gas spring 165 will extend in a first direction 180. Such movement of the first end 170 of the gas spring 165 will cause a moment force on the upright portion 20 of the seat and pivot the upright portion 20 of the seat toward the default position in the absence of an operator-supplied force against such movement.

In the illustrated embodiment, the gas spring 165 is not a structural element of the seat frame 30, 40, but the first and second toothed members 100, 110 are structural elements. All load applied to the seat 10 through the seat belt assembly goes directly to the frame 30, 40 and the first and second toothed members 100, 110. The first and second toothed members 100, 110 are therefore in the load path and the spring 165 is not. The toothed members 100, 110 may be constructed with an investment casting process, for example, and their teeth must be sufficiently sturdy to withstand loads generated by forward movement of the operator in response to sudden stopping of the vehicle in which the seat 10 is installed. The frame 30, 40 and first and second toothed members 100, 110 are together able to meet industry standards for pull tests on the seat belt assembly without requiring a tether or other structural connection between the seat and the vehicle other than mounting the seat to the vehicle floor.

Figure 7:
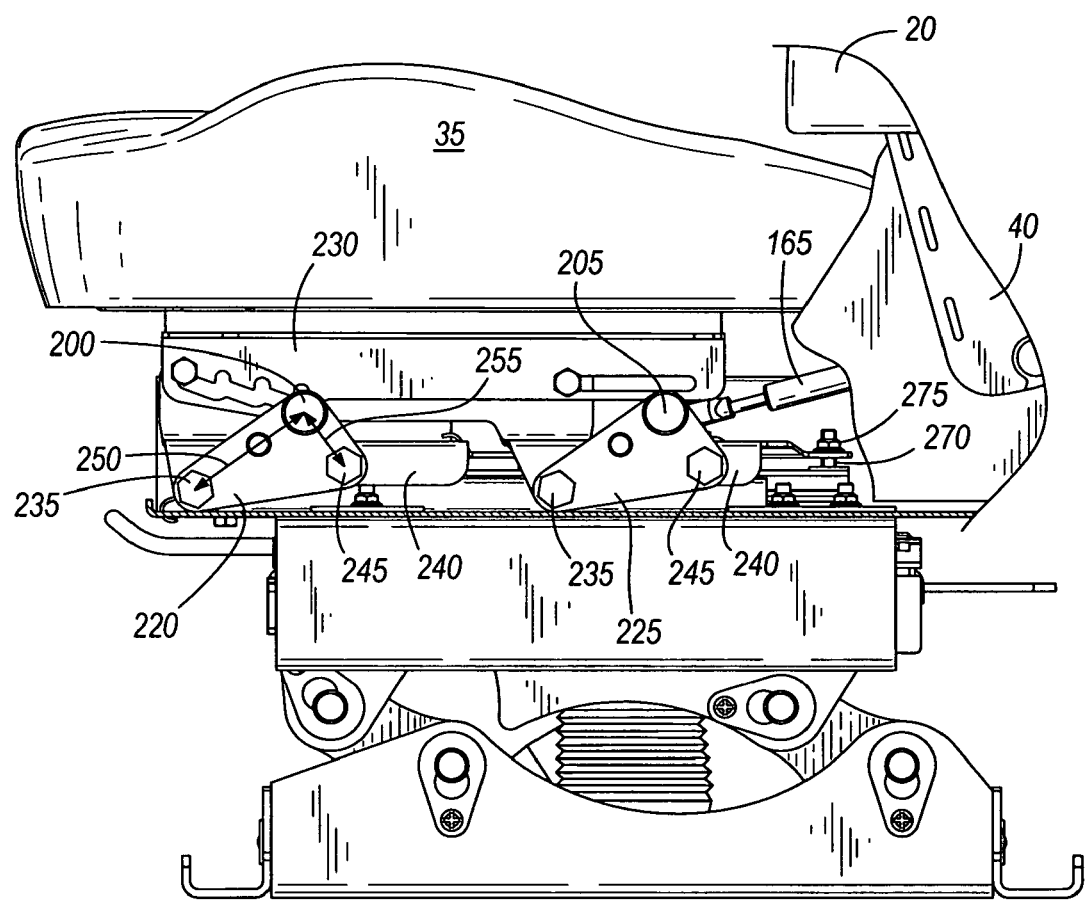
FIG. 7 is a side view of a cushion height adjustment mechanism of the seat in a first operating position.
Figure 8:
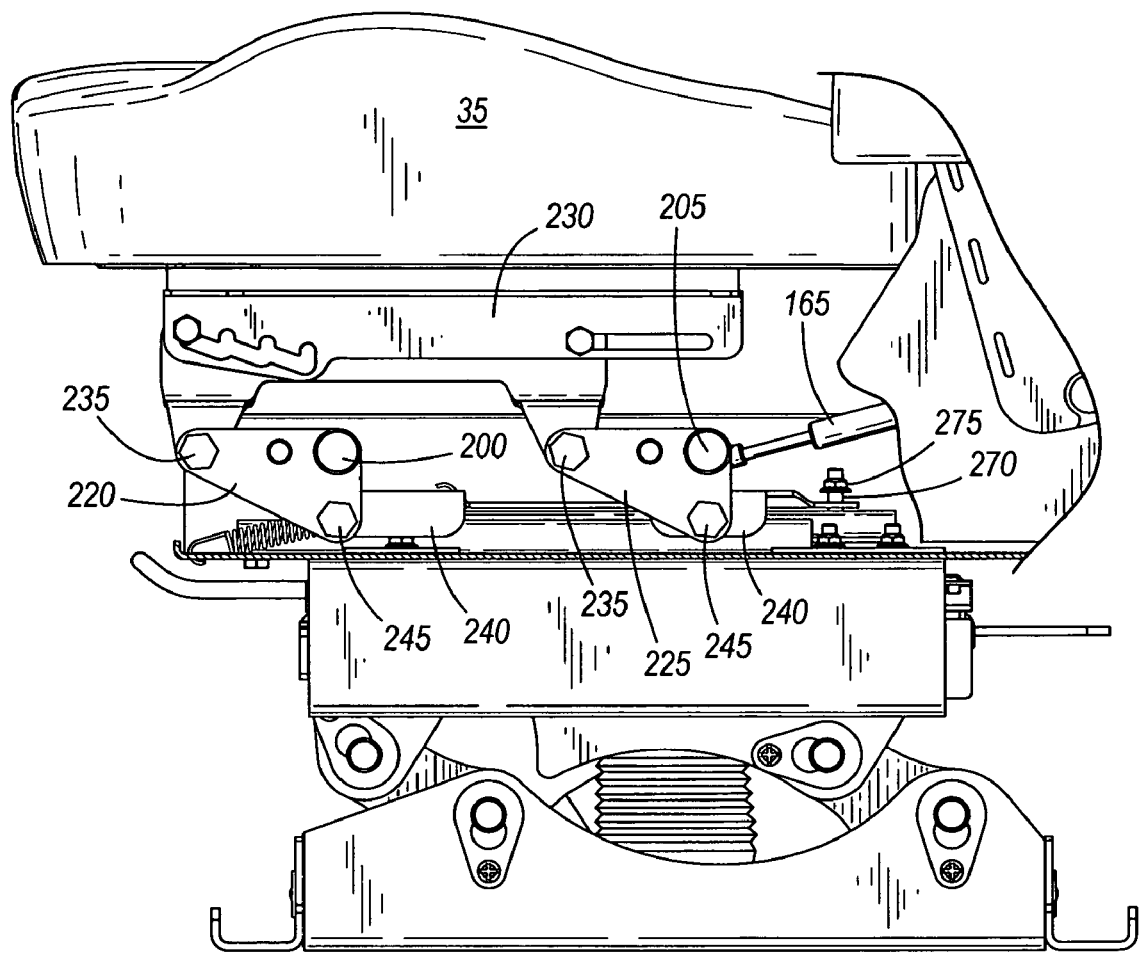
FIG. 8 is a side view of the cushion height adjustment mechanism in a second operating position.
Figure 9:
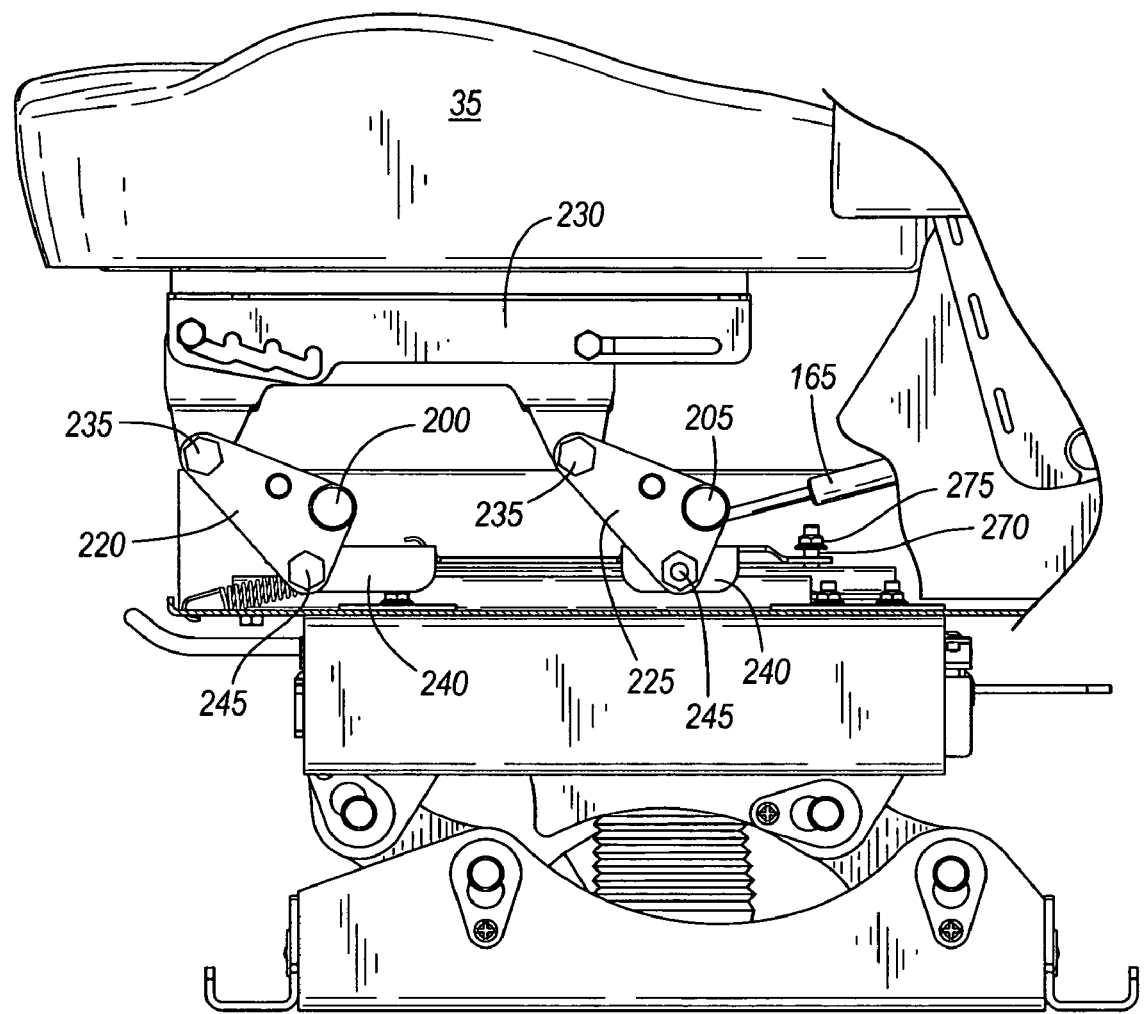
FIG. 9 is a side view of the cushion height adjustment mechanism in a third operating position.

FIGS. 7-9 illustrate a bottom cushion height adjustment mechanism that permits an operator to adjust the height of the bottom cushion 35 with respect to the base frame 30. The bottom cushion height adjustment mechanism includes forward and rear cam support rods 200, 205 supported by the base frame 30. The rods 200, 205 have respective longitudinal axes 210, 215 (FIG. 1). The support rods 200, 205 extend across the width of the base frame 30 (i.e., from the first side 12 of the seat to the second side 13 of the seat). A pair of forward cams 220 are rigidly mounted to the opposite ends of the forward cam support rod 200, and a pair of rear cams 225 are rigidly mounted to the opposite ends of the rear cam support rod 205. Although only one of each pair of cams 220, 225 is illustrated in FIGS. 7, 8, and 9 (because only the first side 12 of the seat 10 is illustrated in those figures), it is to be understood that the second side 13 is a substantial mirror image of the first side 12 and the cams 220, 225 on the second side 13 are substantially identical to the cams 220, 225 on the first side 12.

Each cam 220, 225 is pivotably connected to a cushion frame 230 of the bottom cushion 35 through a cushion bolt 235, and to a slidable member or pan 240 through a pan bolt 245. The bolts 235, 245 are substantially parallel to the longitudinal axes 210, 215 of the cam support rods 200, 205, and move in arcuate paths about the longitudinal axes 210, 215 of the cam support rods 200, 205 as the cams 220, 225 rotate. The arcuate paths include some up-and-down motion and some forward-and-rearward motion, and consequently movement of the bottom cushion 35 and the pan 240 includes vertical and horizontal components. The distance 250 between the cushion bolts 235 and the cam support rods 200, 205 is greater than the distance 255 between the pan bolts 245 and the cam support rods 200, 205. As a result, the bottom cushion's displacement is larger than the pan's displacement for any degree of cam rotation. In the illustrated construction, the cams 220, 225 convert linear movement of the pan 240 into vertical movement of the bottom cushion 35 at a 1:2 linear-to-vertical ratio.

Figure 7A:
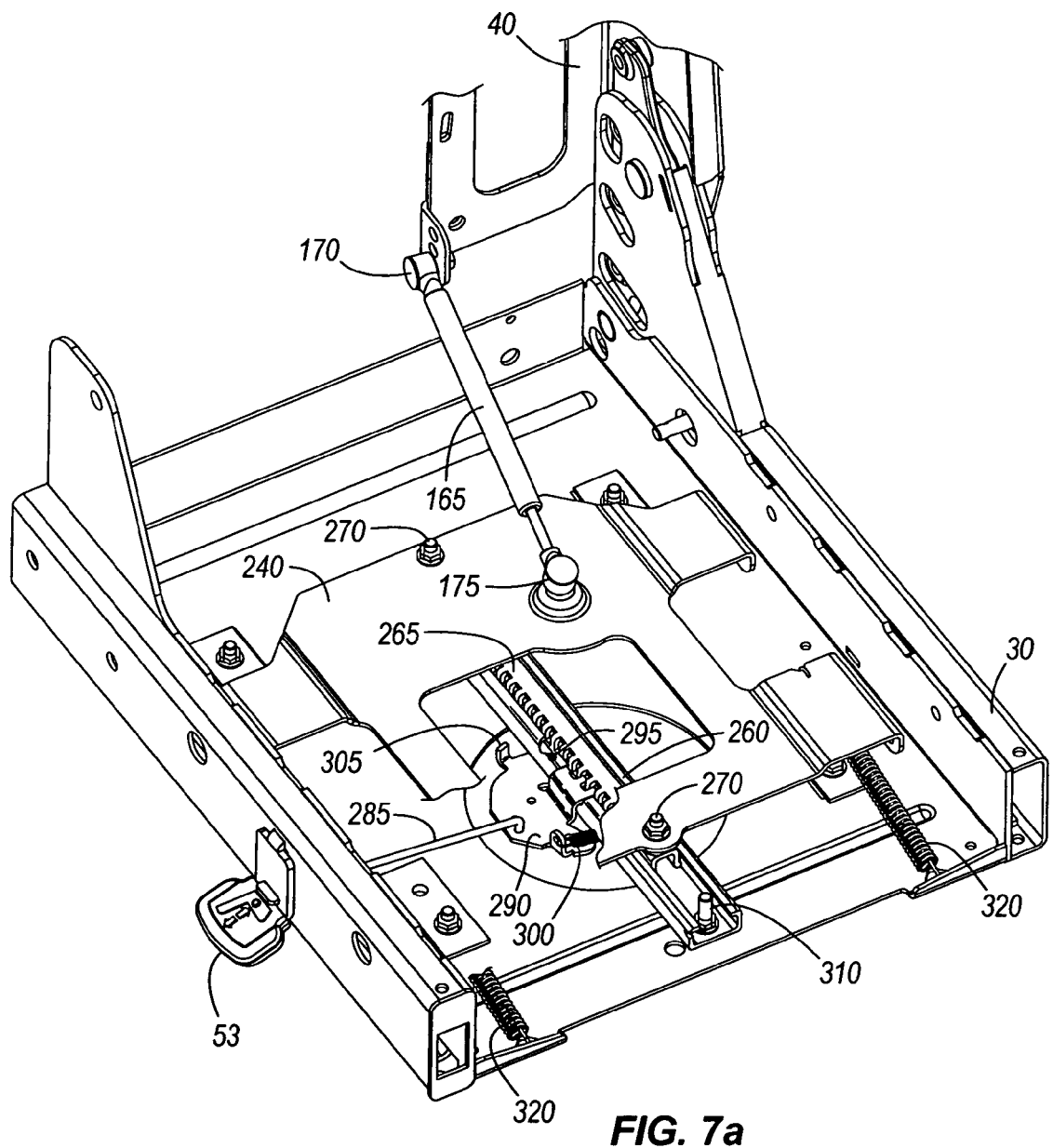
FIG. 7a is a perspective, partially cut-away view of the cushion height adjustment mechanism in the first operating position.
Figure 8A:
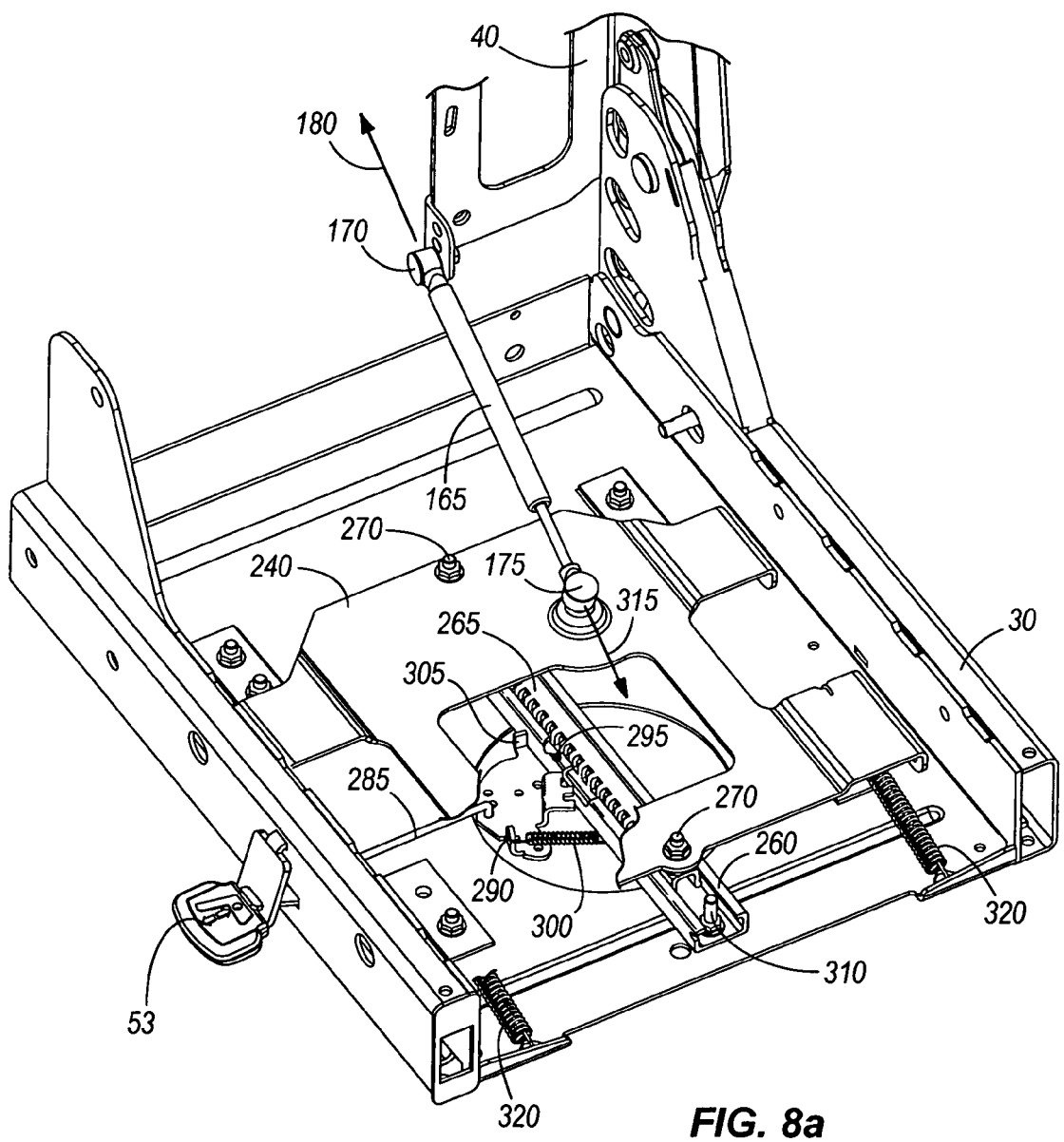
FIG. 8a is a perspective, partially cut-away view of the cushion height adjustment mechanism in the second operating position.
Figure 9A:
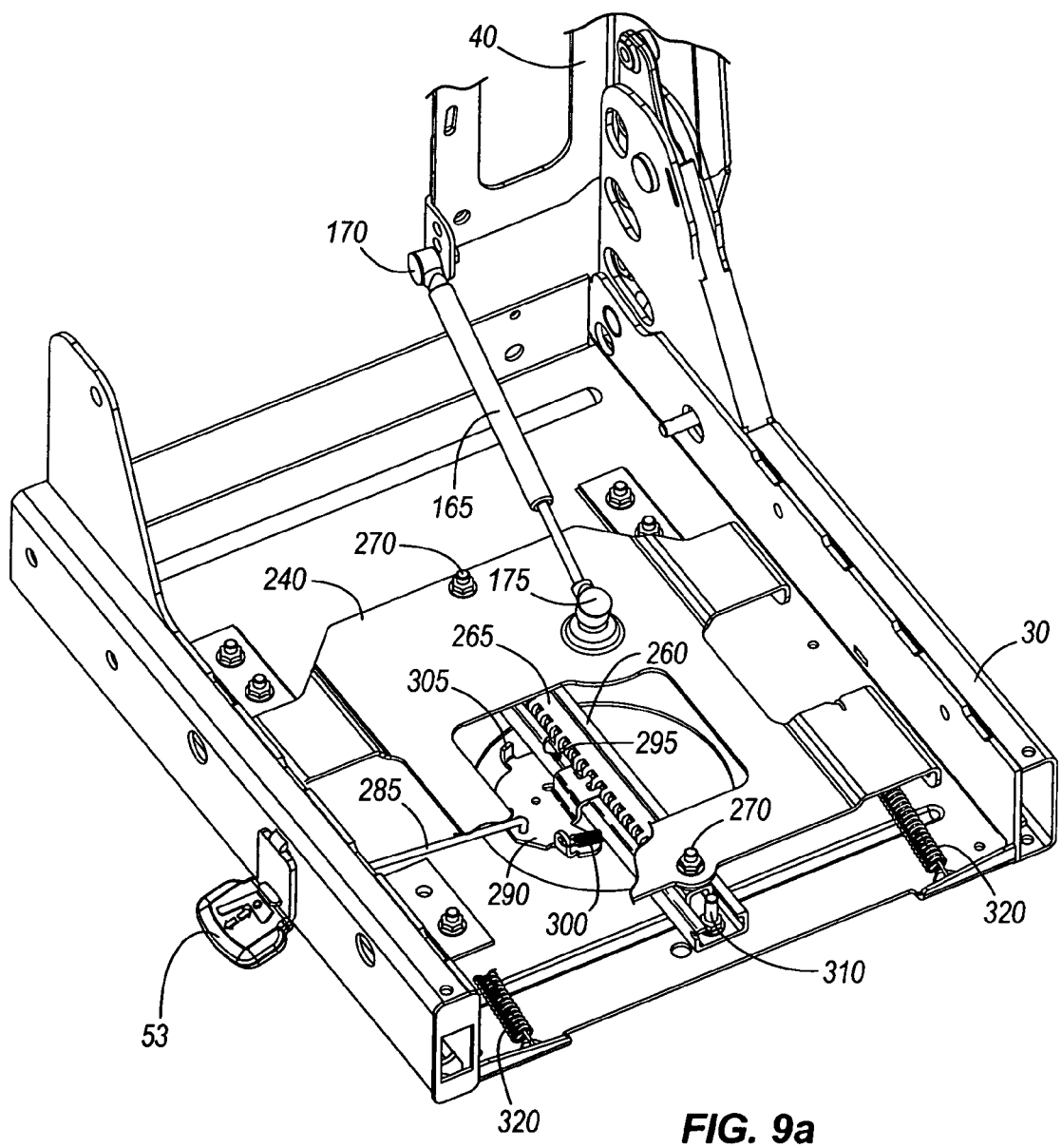
FIG. 9a is a perspective, partially cut-away view of the cushion height adjustment mechanism in the third operating position.

With reference to FIGS. 7a, 8a, and 9a, a channel 260 is rigidly mounted to the base frame 30, and an elongated toothed member 265 is slidably received within the channel 260 for linear translational movement. A pair of guide bolts 270 extend upwardly from the elongated toothed member 265 and through holes in the pan 240. The distal end of each guide bolt 270 includes a stopping member 275 (FIGS. 7, 8, and 9), such as the illustrated nut and washer combination. The pan 240 freely slides up and down on the guide bolts 270 between the elongated toothed member 265 and the stopping members 275. In the illustrated construction, the cams 220, 225 cause bottom cushion 35 to move vertically two units for every one unit of linear movement of the elongated toothed member 265 within the channel 260 (i.e., a 1:2 ratio of horizontal elongated toothed member 265 movement to vertical bottom cushion 35 movement).

The holes in the pan 240 through which the guide bolts 270 extend are sized closely to the diameter of the guide bolts 270 to reduce slop between the pan 240 and guide bolts 270. The elongated toothed member 265 and pan 240 slide forward and rearward through the interengagement of the guide bolts 270 and pan 240. In alternative embodiments, the guide bolts 270 may be replaced with guide posts, pins, or substantially any element that permits vertical movement of the pan 240 while transferring forward and rearward movement of the pan 240 to the elongated toothed member 265.

With reference to FIGS. 7a, 8a, and 9a, the bottom cushion height adjustment mechanism also includes a height locking mechanism that includes the actuation handle 53, a link 285, and a locking toothed member 290. The locking toothed member 290 is pivotably mounted to the base frame at a pivot point 295 (under the channel 260). A spring 300 biases the locking toothed member 290 into engagement with the elongated toothed member 265. When an operator lifts the actuation handle 53, it applies tension to the link 285 which in turn causes the locking toothed member 290 to disengage from the elongated toothed member 265. The bottom cushion 35 can then lower under the weight of the operator sitting on it. The range of motion of the locking toothed member 290 is limited at one extreme by engagement of its teeth with those of the elongated toothed member 265 (see FIGS. 7a and 9a) and at the other extreme by a tab 305 abutting the channel 260 (see FIG. 8a).

The range of motion of the bottom seat cushion is defined by a limiter 310 at each end of the channel 260. Although only one limiter 310 is illustrated, the one not illustrated is substantially identical to the one illustrated and is at the opposite end of the channel 260. The bottom seat cushion 35 is movable between the fully-down position (FIGS. 7 and 7a) in which the elongated toothed member 265 abuts the limiter 310 at one end of the channel 260, and the fully-up position (FIGS. 9 and 9a) in which the elongated toothed member 265 abuts the limiter 310 at the other end of the channel 260.

The bottom cushion height adjustment mechanism utilizes the gas spring 165 to bias the bottom seat cushion 35 toward the fully-up position, such that the fully-up position is the bottom seat cushion's default position. The second end 175 of the gas spring 165 is interconnected with the pan 240 through a ball-and-socket connection to accommodate the vertical and horizontal movement of the pan 240. When the locking toothed member 290 is disengaged from the elongated toothed member 265 (as in FIG. 8a), the second end 175 of the gas spring 165 will extend in a second direction 315. Such movement of the second end 175 of the gas spring 165 will cause the pan 240 to move forward, which will cause clockwise rotation of the cams 220, 225 as seen in FIGS. 7, 8, and 9, which will in turn cause the bottom seat cushion 35 to raise toward the default position in the absence of an operator-supplied force against such movement. Tension springs 320 connected between the pan 240 and the base frame 30 assist the gas spring 165 in biasing the bottom seat cushion 35 toward the default position.

The operator controls the height of the bottom seat cushion 35 with his or her weight. More specifically, the operator lifts up on the actuation lever 53 to disengage the locking toothed member 290 from the elongated toothed member 265, and then reduces the weight applied to the bottom seat cushion 35 to permit it to raise, or increases the weight applied to the bottom seat cushion 35 to overcome the bias of the gas spring 165 and force the bottom seat cushion 35 to lower. Once the bottom seat cushion 35 is at the desired height, the operator releases the actuation lever 53 to permit the locking toothed member 290 to engage the elongated toothed member 265 under the bias of the return spring 300.

To summarize, in the absence of the operator applying an overwhelming opposing force, the gas spring 165 extends in the first direction 180 when the bottom cushion height adjustment mechanism is locked and the recline mechanism is unlocked, and this causes the upright portion 20 to move to its fully-forward default position. In the absence of the operator applying an overwhelming opposing force, the gas spring 165 extends in the second direction 315 when the recline mechanism is locked and the bottom cushion height adjustment mechanism is unlocked, and this causes the bottom seat cushion 35 to move to its fully-raised default position.

In light of the dual purpose of the gas spring 165 (i.e., returning the upright portion of the seat and the bottom cushion to their respective default positions), the gas spring should be selected to be sufficiently stiff to return the upright position to its fully-forward position, but sufficiently soft so that the bottom cushion height may be adjusted downward (i.e., so the biasing force of the gas spring will be overcome) under the weight of the lightest operator expected to occupy the seat. The illustrated gas spring 165 is rated at about 100-110 lbs, but could be between 80-120 lbs. Other gas springs and other types of biasing members meeting the above-noted design requirements and functionality may be used in other embodiments.

Various features and advantages of the invention are set forth in the following claims.

What is claimed is:

1. A seat comprising:
 a base portion including a rigid base frame and a seat bottom cushion supported by the base frame;
 a generally upright portion extending up from and being pivotable with respect to the base portion and including a rigid back frame and a seat back cushion mounted to the back frame;
 means for adjusting the height of the bottom cushion through a range of motion with respect to the base frame, the bottom cushion having a default height within the range of motion;
 means for adjusting the angle of the upright portion of the seat through a range of motion with respect to the base portion of the seat, the upright portion having, within the range of motion, a default angle with respect to the base portion; and
 a biasing member interconnected between the base portion and upright portion of the seat and actuable in one direction to bias the bottom cushion toward the default height and in a second direction to bias the upright portion of the seat toward the default angle;
 wherein the biasing member includes a gas spring having one end affixed to the upright portion of the seat and the opposite end affixed to the means for adjusting the height of the bottom cushion; wherein the gas spring is in one instance braced against the means for adjusting height and actuable in the first direction to cause pivotal movement of the upright portion to its default angle; and wherein the gas spring is in another instance braced against the upright portion of the seat and actuable in a second direction to actuate the means for adjusting height to move the bottom seat cushion to its default height.

2. The seat of claim 1, further comprising:
a belt having opposite ends each interconnected to one of the upright and base portions of the seat;
a first buckle member interconnected with the belt; and
a second buckle member affixed to one of the upright and base portions of the seat;
wherein interconnecting the first and second buckle members causes portions of the belt to extend across the lap and chest of a person sitting in the seat.

* * * * *